June 9, 1953  F. A. SCHUMACHER  2,641,113
FREEZER EVAPORATOR, INCLUDING CHECK VALVE IN HEADER
Filed Jan. 10, 1952
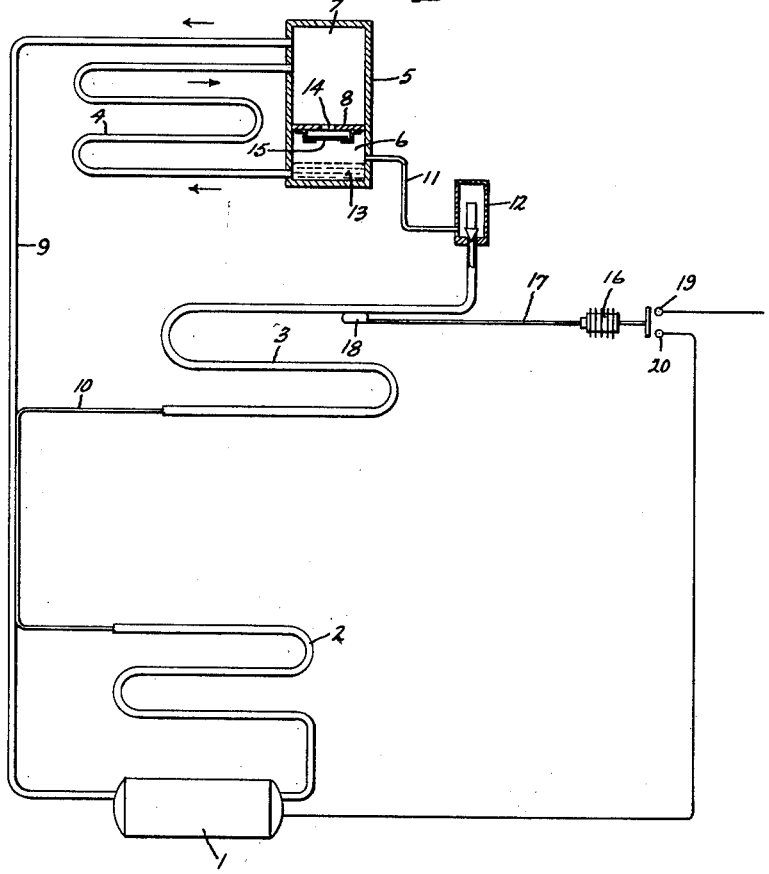
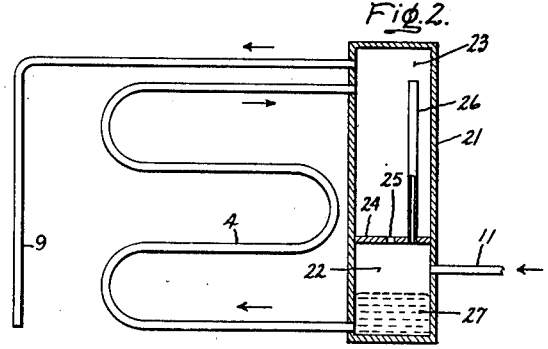
Inventor:
Frank A. Schumacher,
by  *Sheridan␣*
His Attorney.

Patented June 9, 1953

2,641,113

UNITED STATES PATENT OFFICE 2,641,113

FREEZER EVAPORATOR, INCLUDING CHECK VALVE IN HEADER

Frank A. Schumacher, Erie, Pa., assignor to General Electric Company, a corporation of New York Application January 10, 1952, Serial No. 265,813

4 Claims. (Cl. 62—117.6)

My invention relates to refrigerating apparatus and pertains more particularly to two-temperature refrigerating systems wherein fresh food evaporators and freezer evaporators are connected and operated in series.

It is the primary object of my invention to provide in a two-temperature refrigerating system including a fresh food evaporator and a freezer evaporator connected in series, means whereby the refrigeration process commences throughout the system substantially immediately after a refrigerating unit in the system starts operating.

Another object of my invention is to provide in a two-temperature refrigerating system including a fresh food evaporator and a freezer evaporator operated in series, means for promptly supplying the freezer evaporator with liquid refrigerant and commencing the refrigerating process therein substantially immediately upon the starting of the refrigerating unit.

Further objects and advantages of my invention will become apparent as the following description proceeds and the features of novelty which characterize my invention will be pointed out with particularity in the claims annexed to and forming a part of this specification.

In carrying out the objects of my invention, I provide a two-temperature refrigerating system including a fresh food evaporator, a freezer evaporator and a refrigerating unit. I provide, also, a vertical header divided into upper and lower chambers. Refrigerant is supplied to the fresh food evaporator by the refrigerating unit and is expelled from the fresh food evaporator into the lower chamber of the header. One side of the freezer evaporator is connected to the lower chamber of the header below the level of a liquid reserve therein, and the other side is connected to the upper chamber. I also provide means effective both for permitting an accumulation of pressure in the lower chamber when the refrigerating unit is operating and for permitting drainage of liquid refrigerant from the upper chamber into the lower chamber when the refrigerating unit is idle.

For a better understanding of my invention, reference may be had to the accompanying drawing in which Fig. 1 is a schematic showing of a two-temperature refrigerating system including a preferred embodiment of my invention; and Fig. 2 illustrates a modified form of my invention.

Referring to the drawing, I have shown in Fig. 1 a two-temperature refrigerating system including a refrigerating unit 1, a condenser 2 connected to the refrigerating unit, a fresh food evaporator 3 and a freezer evaporator 4. Also included in the system is a vertical header 5. The header 5 is divided into lower and upper chambers 6 and 7, respectively, by a horizontal partition 8. Connecting the upper chamber 7 with the refrigerating unit 1 is a suction line 9. Placed in heat exchange relationship with the suction line and provided for connecting the condenser 2 with the fresh food evaporator 3 is a capillary tube 10.

Provided for connecting the outlet side of the fresh food evaporator 3 with the lower chamber 6 of the header 5 is a conduit 11. Included in the system between the fresh food evaporator 3 and the conduit 11 is a weight-type pressure differential valve 12 provided for maintaining a desired pressure differential between the fresh food evaporator and the lower chamber 6.

The lower chamber 6 of the header 5 is adapted to hold a reserve of liquid refrigerant indicated by 13 in Fig. 1. One side of the freezer evaporator 4 is connected to the lower chamber 6 at a point below the level of the reserve 13, and the other side of the evaporator 4 is connected to the upper chamber 7 near the top thereof.

Formed in the partition 8, and providing communication between the lower chamber 6 and the upper chamber 7, is an aperture 14. Cooperating with the aperture 14 to form a check valve for controlling the communication between the lower and upper chambers of the header 5 is a disk 15.

During idle periods of the refrigerating unit 1 any refrigerant pressure which might exist in the lower chamber 6 is insufficient for raising the disk 15 and closing the aperture 14. Therefore, the check valve is open during idle periods of the refrigerating unit. As soon as the refrigerating unit 1 starts operating, the refrigerant pressure in the lower chamber 6 of the header 5 increases sufficiently for raising the disk 15 to close the aperture 14. Thus, the check valve between the lower and upper chambers is closed and refrigerant pressure is permitted to accumulate in the lower chamber. This accumulation of pressure in the lower chamber exerts a force on the surface of the liquid refrigerant reserve 13 therein and, since one side of the freezer evaporator 4 is connected to the lower chamber below the level of reserve, the liquid refrigerant is thereby promptly supplied to the freezer evaporator. The refrigerant is expelled from the other side of the freezer evaporator 4 and into the upper chamber 7 in both vaporous and liquid forms. The vaporous refrigerant is drawn out of the upper chamber through the suction line 9 by the refrigerating unit 1. The liquid refrigerant collects in the bottom of the upper chamber 7. When the refrigerating unit stops operating, the pressure in the lower chamber decreases and the check valve between the lower and upper chambers is opened. Thus, the liquid refrigerant in the upper chamber is permitted to drain into the lower chamber for thereby replenishing the liquid reserve therein, in preparation for the next operating period of the refrigerating unit 1.

The refrigerating unit 1 includes and is operated by a motor which is not shown. Provided for controlling the operation of the refrigerating unit by controlling the starting and stopping of the motor is a switch operated by a bellows 16. The bellows 16 is connected by a tube 17 to a volatile fluid containing bulb 18, disposed in thermal contact with the fresh food evaporator 3. When the temperature of the evaporator 3 decreases, the pressure of the fluid in the bulb 18 decreases and the bellows 16 contracts and operates the switch to open a circuit at contacts 19 and 20 for stopping the refrigerating unit motor. Conversely, when the temperature of the evaporator 3 increases, the pressure of the fluid in the bulb 18 increases and the bellows 16 expands and operates the switch to close the above-mentioned circuit and thereby start the refrigerating unit motor. By this arrangement the operation of the refrigerating unit 1 is controlled in response to the temperature of the fresh food evaporator 2 whereby a substantially constant temperature is maintainable in the fresh food evaporator.

The vertical header 5 is replaceable in the system described above and shown in Fig. 1 by a modified form of vertical header 21 in the manner shown in Fig. 2. The modified header 21 is divided into lower and upper chambers 22 and 23, respectively, by a horizontal partition 24. The partition 24 includes an orifice 25 of small diameter which provides communication between the lower and upper chambers. Also providing communication between the lower and upper chambers and extending upwardly in the upper chamber is a by-pass tube 26, the bore of which is also small in diameter.

The modified header 21 is adapted to hold a reserve of liquid refrigerant indicated by 27 in the lower chamber thereof. The conduit 11 from the fresh food evaporator is connected to the lower chamber 22. One side of the freezer evaporator 4 is connected to the lower chamber 22 at a point below the level of the liquid reserve 27 therein; and the other side of the freezer evaporator is connected to the upper chamber 23. The suction line 9 to the refrigerating unit is connected to the upper chamber 23 near the top thereof.

The orifice 25 and the bore of the by-pass tube 26, as mentioned above, are small in diameter and are sufficiently restrictive to cause refrigerant pressure to accumulate in the lower chamber 22 of the header 21 when the refrigerating unit starts operating. Thus, a force is exerted on the surface of the liquid reserve 27 and liquid refrigerant therefrom is promptly supplied to the freezer evaporator 4. After passing through the freezer evaporator 4 the refrigerant is expelled in both vaporous and liquid forms into the upper chamber 23. The vaporous refrigerant is drawn out of the upper chamber 23 through the suction line 9 and the liquid refrigerant collects in the bottom of the upper chamber. When the refrigerating unit stops operating, the pressure in the lower chamber 22 decreases permitting the liquid collected in the upper chamber 23 to drain through the orifice 25 into the lower chamber for thereby replenishing the liquid reserve therein. The by-pass tube 26 by extending above the level of collected liquid in the upper chamber 23 permits the passage into the upper chamber from the lower chamber 22 of vaporous refrigerant displaced by the drained liquid. This, of course, facilitates drainage.

While I have shown and described specific forms of my invention, I do not desire my invention to be limited to the particular forms shown and described and I intend by the appended claims to cover all modifications within the spirit and scope of my invention.

What I claim as new and desire to secure by Letters Patent of the United States is:

1. A two-temperature refrigerating system comprising a vertical header divided into lower and upper chambers, a fresh food evaporator, a refrigerating unit supplying refrigerant to one side of said fresh food evaporator and exhausting refrigerant from said upper chamber, the other side of said fresh food evaporator being connected to said lower chamber, a freezer evaporator, one side of said freezer evaporator being connected to said lower chamber below the normal level of a liquid reserve therein, the other side of said freeze evaporator being connected to said upper chamber, and means providing controlled comunication between said lower and upper chambers operating in response to the operation of said refrigerating unit to permit accumulation of pressure in said lower chamber during operation of said refrgerating unit thereby to supply liquid refrigerant promptly from said lower chamber to said freezer evaporator, and to permit drainage of liquid refrigerant from said upper chamber into said lower chamber during idle periods of said refrigerating unit thereby to replenish said reserve.

2. A two-temperature refrigerating system comprising a vertical header divided into lower and upper chambers, a fresh food evaporator, a refrigerating unit supplying refrigerant to one side of said fresh food evaporator and exhausting refrigerant from said upper chamber, the other side of said fresh food evaporator being connected to said lower chamber, a freezer evaporator, one side of said freezer evaporator being connected to said lower chamber below the normal level of a liquid reserve therein, the other side of said freezer evaporator being connected to said upper chamber, and a check valve between said lower chamber and said upper chamber, said check valve closing during operation of said refrigerating unit thereby to permit accumulation of pressure in said lower chamber for the prompt supply of liquid refrigerant from said lower chamber to said freezer evaporator, said check valve opening during idle periods of said refrigerating unit thereby to permit drainage of liquid refrigerant from said upper chamber into said lower chamber for replenishing said reserve.

3. A two-temperature refrigerating system comprising a vertical header divided into lower and upper chambers, a fresh food evaporator, a refrigerating unit supplying refrigerant to one side of said fresh food evaporator and exhausting refrigerant from said upper chamber, the other side of said fresh food evaporator being connected to said lower chamber, a freezer evaporator, one side of said freezer evaporator being connected to said lower chamber below the normal level of a liquid reserve therein, the other side of said freezer evaporator being connected to said upper chamber, an orifice providing communication between said lower chamber and said upper chamber, and means providing further communication between said lower chamber and said upper chamber and by-passing liquid in said upper chamber, said orifice and said means being effective for restricting the flow of refrigerant from said lower chamber into said upper chamber during operation of said refrigerating unit thereby to permit accumulation of pressure in said lower chamber during said operation of said refrigerating unit for the prompt supply of liquid refrigerant from said lower chamber to said freezer evaporator, said orifice permitting drainage of liquid refrigerant from said upper chamber into said lower chamber during idle periods of said refrigerating unit thereby to replenish said reserve, said means affording conduction into said upper chamber of vaporous refrigerant displaced by liquid refrigerant drained into said lower chamber thereby to facilitate drainage.

4. A two-temperature refrigerating system comprising a vertical header, a partition dividing said vertical header into lower and upper chambers, a fresh food evaporator, a refrigerating unit supplying refrigerant to one side of said fresh food evaporator and exhausting refrigerant from said upper chamber, the other side of said fresh food evaporator being connected to said lower chamber, a freezer evaporator, one side of said freezer evaporator being connected to said lower chamber below the normal level of a liquid reserve therein, the other side of said freezer evaporator being connected to said upper chamber, an orifice in said partition connecting said lower chamber and said upper chamber, and a by-pass tube extending upwardly in said upper chamber and connecting said lower chamber and said upper chamber, said orifice and said by-pass tube restricting the flow of refrigerant from said lower chamber into said upper chamber during operation of said refrigerating unit thereby to permit accumulation of pressure in said lower chamber during said operation of said refrigerating unit for the prompt supply of liquid refrigerant from said lower chamber to said freezer evaporator, said orifice permitting drainage of liquid refrigerant from said upper chamber into said lower chamber during idle periods of said refrigerating unit thereby to replenish said reserve, said by-pass tube conducting into said upper chamber vaporous refrigerant displaced by liquid refrigerant drained into said lower chamber thereby to facilitate drainage.

FRANK A. SCHUMACHER.

References Cited in the file of this patent
UNITED STATES PATENTS

| Number | Name | Date |
|---|---|---|
| 2,133,948 | Buchanan | Oct. 25, 1938 |
| 2,146,796 | Dasher | Feb. 14, 1939 |
| 2,146,797 | Dasher | Feb. 14, 1939 |